Nov. 26, 1968　　R. C. RIKE ETAL　　3,412,556

MASTER CYLINDER ASSEMBLY

Filed Oct. 10, 1966

INVENTORS
Richard C. Rike, &
Thomas A. Bratten

ATTORNEY

United States Patent Office 3,412,556
Patented Nov. 26, 1968

3,412,556
MASTER CYLINDER ASSEMBLY
Richard C. Rike and Thomas A. Bratten, Dayton, Ohio, assignors to General Motors Corporation, Detroit, Mich., a corporation of Delaware
Filed Oct. 10, 1966, Ser. No. 585,569
13 Claims. (Cl. 60—54.6)

ABSTRACT OF THE DISCLOSURE

A master cylinder assembly in which excessive pressurizing movement of a pressurizing piston is sensed by a switch positioned internally of the master cylinder bore, the switch being actuated to energize a warning circuit indicating a brake system malfunction. A dual master cylinder assembly having primary and secondary pistons in a common bore uses a part of the secondary piston as a switch contact, and other switch contacts are provided in the bore. The switch changes its condition to actuate the warning circuit if the secondary piston moves excessively, or if the primary piston moves excessively, in a pressurizing direction. Particular piston constructions are disclosed for use when the switch is a normally open, closed when actuated, type.

---

The invention relates to a master cylinder of the type utilized in vehicle brake systems and more particularly to one in which the excessive movement of a pressurizing piston is sensed to provide a warning signal indicating a brake system malfunction. The invention is more particularly related to a master cylinder of the dual piston type in which primary and secondary pistons operate in a common bore to pressurize fluid in two pressurizing chambers for separate fluid connection to separate vehicle wheel brakes. In master cylinders of this type the secondary or floating piston is utilized to provide a switch contact which engages another contact to energize a warning circuit if fluid in either of the pressurizing chambers cannot be pressurized for any reason, resulting in excess movement of one or both of the pressurizing pistons.

It is a feature of the invention to provide the floating piston with an electrically conductive body center section which is electrically insulated from the assembly body in which it moves and is so arranged that when the piston moves sufficiently to engage the end wall of the bore the body and the bore and wall operate as electrical contacts of a switch. Similarly, the primary piston is in electrical contact with the assembly body at all times and when it is sufficiently moved toward the floating piston it will contact the floating piston body section to complete the warning circuit. If the warning circuit is energized for failure of either brake fluid circuit, the operator is made readily aware of the fact and can take corrective action.

In one embodiment of the invention the floating piston is constructed with piston rings which engage the master cylinder bore wall and which are separated from the piston body center section by suitable insulators.

In another modification of the invention the piston rings are made of a suitable material such as aluminum and are provided with an electrically insulating coating which is preferably formed by hard coat anodizing the piston rings. Such a coat will provide effective electrical insulation between the piston body center section and the master cylinder assembly body and will also provide hard wear surfaces for long piston life.

The invention may be practiced by utilizing a contact plug assembly extending either through the assembly body side wall directly into the bore or extending through a part of the assembly body side wall connecting with a brake fluid reservoir. The contact plug assembly may be formed with a wire terminal which is in sliding engagement with the floating piston body center section, with the wire terminal having a spring action maintaining this contact. The contact plug assembly may alternatively be formed as a probe extending through an insulator positioned in an aperture connecting the master cylinder bore and a fluid reservoir chamber, with the probe being electrically connected to a terminal post by a spring which also urges the probe into engagement with the floating piston body center section.

Figure 1:
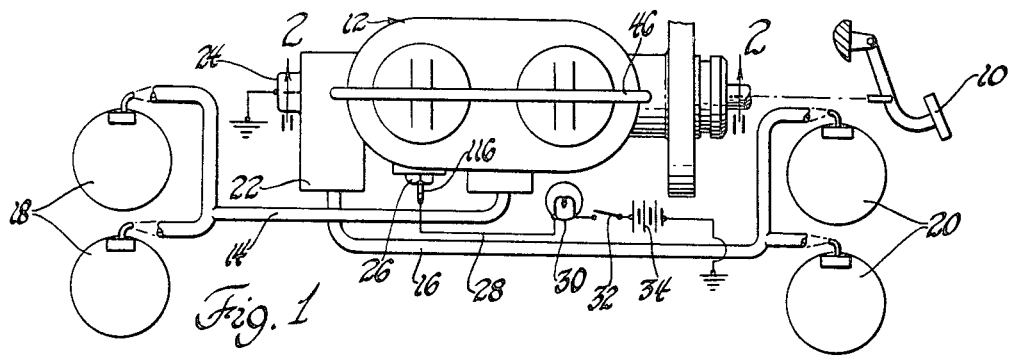
FIGURE 1 is a schematic representation of a vehicle brake system embodying the invention and showing a suitable electrical circuit which when energized will provide a warning.

The brake system is schematically illustrated in FIGURE 1 as including a brake pedal 10 which operates the master cylinder assembly 12 to pressurize fluid in the front brake conduit 14 and the rear brake conduit 16 to actuate the front vehicle wheel brakes 18 and the rear vehicle wheel brakes 20. The master cylinder assembly 12 has an assembly body 22 which is electrically grounded, as schematically illustrated by electrical lead 24. The contact plug assembly 26 which senses a brake system malfunction, as described below, is in an electrical circuit 28 containing an indicator 30 schematically illustrated as a warning lamp, a normally open brake switch 32 which may also be the same switch that operates the stop lights, and a source of electricity such as battery 34. When the switch contained within the master cylinder assembly 12 is closed, circuit 28 is electrically energized provided the brake switch 32 is closed by depression of the brake pedal 10. This will cause the indicator lamp 30 to be energized and warn the vehicle operator that a brake system malfunction has occurred. The malfunction may be in either the front brake system or the rear brake system, or possibly in both systems. It is extremely unlikely, however, that the malfunction would occur in both systems at the same time. Therefore the operator will have sufficient wheel brake operation to stop the vehicle. In many vehicles the loss of pressure in one of the brake systems may go unnoticed by the operator during light and normal braking operation; however, the provision of a warning system of this type will unmistakably bring the existence of such a malfunction to the attention of the operator.

Figure 2:
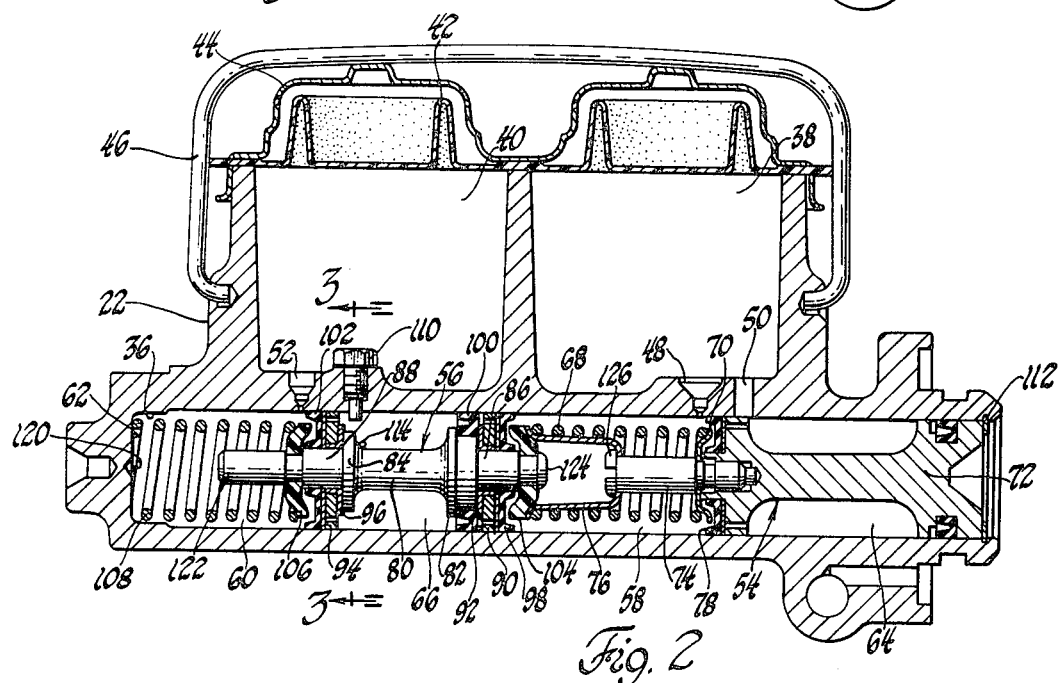
FIGURE 2 is a cross section view of the master cylinder assembly of FIGURE 1, taken in the direction of arrows 2—2 of that figure.

The master cylinder assembly 12 is shown in greater detail in FIGURE 2. The assembly body 22 has a bore 36 formed therein, as well as a front brake fluid reservoir 38 and a rear brake fluid reservoir 40. The reservoirs are sealed in a conventional manner by a diaphragm type seal 42 and a cover 44 held in place by a bail 46. Compensating ports 48, 50 and 52 connect the bore 36 with the reservoirs at appropriate positions for brake master cylinder operation in the usual manner. A primary pressurizing piston assembly 54 and a secondary pressurizing piston assembly 56 are reciprocably received in bore 36 so that they divide the bore into a primary pressurizing chamber 58 between the two piston assemblies and a secondary pressurizing chamber 60 between the secondary piston assembly 56 and the end wall 62 of the bore. Since the piston assemblies have a spool-like form, chambers 64 and 66 are provided which encircle the center portion of each piston assembly and are at the same fluid pressure as the brake fluid reservoirs 38 and 40. A primary piston return spring 68 has one end engaging a spring retainer 70 mounted on the primary piston 72 by a screw 74. The other end of spring 68 engages a spring retainer 76 which is mounted on screw 74 and limits the expansion of spring 68. A pressurizing cup 78 is provided on the forward end of piston 72 in the usual manner.

The secondary piston assembly 56 includes a piston body center section 80 which is made of a suitable electrically conductive material and is constructed with space lands 82 and 84, a rearward extension 86, and a forward extension 88. The portion of the body center section intermediate the lands 82 and 84 has a reduced cross section area which is surrounded by chamber 66. A piston ring 90 is mounted on the rearward extension 86 but is separated therefrom by an insulator 92. Similarly, piston ring 94 is mounted on the forward extension 88 but is separated therefrom by insulator 96. Suitable piston cups 98, 100 and 102 are provided. The piston rings act as supports for these cups. A rear spring seat 104 formed of a suitable insulating material is mounted on the rearward extension 86 and provides a seat for the retainer 76 and the forward end of the spring 68. Another spring seat 106 made of suitable insulating material is provided on the forward extension 88 and is engaged by the rear end end of spring 108 engages the bore end wall 62. The piston stop 110 is utilized to hold the secondary piston assembly 56 in place during assembly. The snap ring 112 in the open end of the bore 36 acts as a piston stop for the primary piston assembly 54 and, since spring 68 is somewhat stronger than spring 108, that spring, in conjunction with its retainers 70 and 76 and screw 74, acts as a stop for the secondary piston assembly during normal operation.

Figures 3, 4:
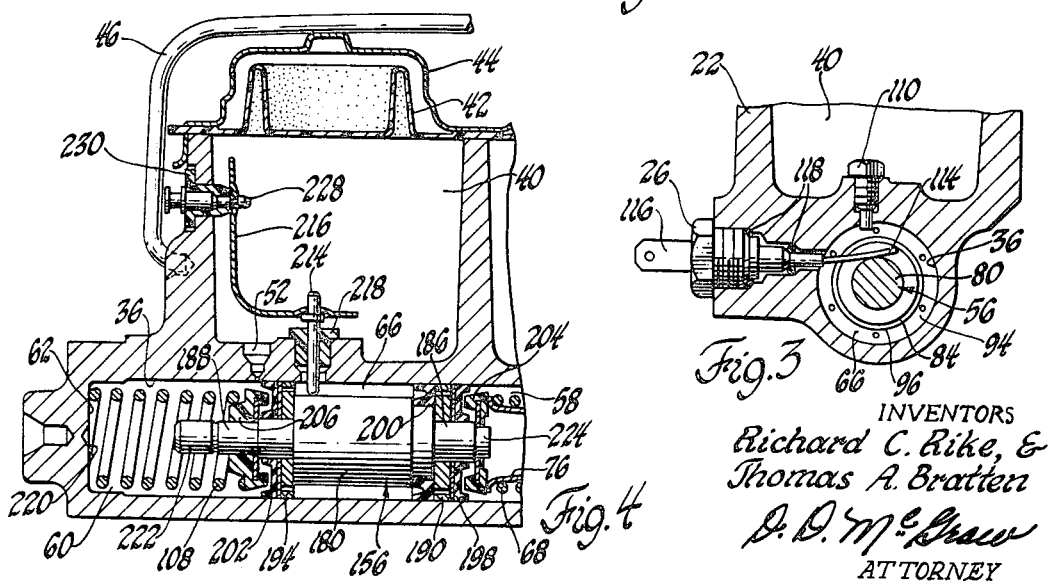
FIGURE 3 is a cross section view with parts broken away, and taken in the direction of arrows 3—3 of FIGURE 2.
FIGURE 4 is a cross section view with parts broken away of a modification of the master cylinder assembly illustrated in FIGURE 2.

As better shown in FIGURE 3, the contact plug assembly 26 extends through a side wall of the assembly body 22 and into chamber 66 of the bore 36. The inner portion of the contact plug assembly 26 is a spring-biased wire 114 which slidably engages the reduced area of the piston body center section 80 intermediate the lands 82 and 84 so that it is in electrical contact with the piston body center section. The wire is connected in the plug assembly 26 to the terminal 116 through suitable insulation. The plug assembly is provided with suitable fluid seals 118 to prevent leakage of any fluid from chamber 66 to the exterior of the master cylinder assembly. Terminal 116 is electrically connected to circuit 28.

When the master cylinder is assembled as shown in FIGURES 2 and 3, it can be seen that the bore end wall 62 provides an electrical contact 120 which cooperates with an electrical contact 122 on the piston body forward extension 88. These contacts operate as a switch to close the warning circuit 28 when the secondary piston assembly bottoms out against the bore end wall 62. The rearward extension 86 of the piston body center section provides another electrical contact 124 which is aligned with an electrical contact 126 formed by the head of screw 74 of the primary assembly 54. Thus when the primary piston assembly 54 moves in a fluid pressurizing direction for pressurizing fluid in chamber 58, but is unable to sufficiently pressurize fluid due to, for example, loss of fluid in the front brake system 14, contacts 124 and 126 will close, causing the warning circuit 28 to be energized.

A modified structure is shown in FIGURE 4. The secondary piston assembly 156 has a piston body center section 180 formed with a rearward extension 186 and a forward extension 188. Piston rings 190 and 194 are mounted on rearward extension 186 and forward extension 188 adjacent the center portion of the piston body 180. Seal cups 198, 200 and 202 are provided to seal the primary pressurizing chamber 58 and the secondary pressurizing chamber 60 from the chamber 66. The spring seat 204 is mounted on the rear extension 186 and receives the spring retainer 76 in the forward end of spring 68.

The spring retainer 206 is mounted on the forward extension 188 and provides a seat for the rear end of spring 108. The piston rings 190 and 194 are preferably made of aluminum or an aluminum alloy which is hard coat anodized to provide a coating which serves as an insulator between the piston body 180 and the assembly body 22. This coat may be on the order of .001–.002 inch thick for this purpose. The coat also provides a hard wear surface.

An electrical connector is provided by probe 214 which extends through an insulator 218 inserted through an aperture formed through the assembly body 22. The aperture connects the rear brake reservoir 40 with the bore 36 and more particularly with chamber 66. Probe 214 is preferably slidably movable in insulator 218 and is urged into physical contact with the piston body 180 by means of a spring 216. A terminal post 228 extends through a side wall in the upper portion of reservoir 40 and is insulated therefrom by an insulator plug 230. The outer end of post 228 is connected to circuit 28. Spring 216 is so biased as to urge probe 214 downwardly and also acts as an electrical connector between the probe and the post 228. This arrangement eliminates an outside connection which is exposed to bore 36 and thus eliminates the possibility of fluid leakage from the bore adjacent the contact plug assembly. The chamber 66 is at reservoir pressure and any fluid passing out of that chamber adjacent probe 214 will merely be returned to the reservoir 40.

The bore end wall 62 provides electrical contact 220 which is engageable by electrical contact 222, provided by the end of forward extension 188. Similarly, the end of rearward extension 186 provides electrical contact 224 which can be engaged by contact 126 of the primary piston assembly 54 when the modified construction is utilized in the master cylinder assembly of FIGURE 2.

The modified structure operates in the same manner as does the structure of FIGURE 2, with probe 214 maintaining contact with the piston body center section 180 during normal master cylinder operation so that when a pressure loss occurs in either of the pressurizing chambers the appropriate contacts close and the warning circuit is energized.

While a spring wire type of piston body connector 114 has been illustrated as being installed through a side wall of the assembly body, such a connector may be installed in the position occupied by probe 214 and insulator 218 if such a connector structure is desired. Likewise, the piston ring and insulator structure of FIGURE 2 may be utilized in the secondary piston structure of FIGURE 4, and vice versa, if desired. While the invention is disclosed in a dual or tandem piston master cylinder embodiment, it may be utilized in other types of master cylinders and in pressurizing systems other than brake systems.

We claim:
1. A master cylinder assembly comprising:
a cylinder body having cylinder bore means formed therein and including hydraulic fluid pressurizing chamber means,
hydraulic fluid pressurizing means including at least one piston movable in said chamber means to pressurize hydraulic fluid therein,
and a warning circuit switch mounted in said cylinder bore means and actuatable between open and closed switch conditions upon predetermined excess fluid pressurizing movement of said piston to energize a warning circuit,
said warning circuit switch having a first electrical contact associated with said cylinder body and a second electrical contact formed as a part of said piston and electrically insulated from said cylinder body and selectively engageable with said first electrical contact to open and close said switch,
said switch being in one of said switch conditions so long as the movement of said piston does not exceed said predetermined excess fluid pressurizing move- ment and actuatable to the other of said switch conditions when the movement of said piston exceeds said predetermined excess fluid pressurizing movement.

2. The master cylinder assembly of claim 1,
said fluid pressurizing means including another piston continually electrically engaging said cylinder body,
said pressurizing chamber means including a first chamber defined by said cylinder body and said pistons and a second chamber defined by said cylinder body and said one piston,
said another piston forming a third electrical contact engageable with said second electrical contact.

3. The master cylinder assembly of claim 2,
said one piston comprising an electrically conductive piston body having a piston ring mounted thereon and an electrical insulator electrically intermediate said piston body and said ring,
said ring engaging said cylinder body and providing a piston pressurizing cup support,
said piston body being said second electrical contact.

4. The master cylinder assembly of claim 1,
said second contact being an electrically conductive piston body forming a part of said pressurizing means,
and means forming a part of said fluid pressurizing means and electrically insulating said piston body from said cylinder body.

5. The master cylinder assembly of claim 1,
said pressurizing means including a floating piston having an electrically conductive center section electrically insuated from said cylinder body and forming said second contact.

6. The master cylinder assembly of claim 1, further comprising:
an electrically conductive member extending into said cylinder bore means and electrically engaging said second contact and extending through said cylinder body and outwardly of said master cylinder assembly for electrical connection in a warning circuit.

7. The master cylinder assembly of claim 6,
said electrically conductive member including a wire extending into said cylinder bore means and slidably engageable with said second contact throughout the range of movement of said pressurizing means.

8. The master cylinder assembly of claim 6,
said electrically conductive member having parts thereof positioned within a fluid reservoir chamber on said cylinder body and extending outwardly of said master cylinder assembly at a point above the normal fluid level in said reservoir chamber, and extending through said cylinder body from said reservoir chamber into said cylinder bore means.

9. A brake dual master cylinder assembly having an assembly body and a primary piston and a floating secondary piston in tandem in a bore in said body and defining therewith primary and secondary fluid pressurizing chambers,
said secondary piston having a body section electrically insulated from said assembly body and electrically connected to one side of a source of electricity and an electrically energizable warning indicator,
said assembly body being electrically connected to the other side of said source of electricity and to said primary piston, piston return spring means yieldably urging said secondary piston to a center position away from said primary piston and from the bottom of said secondary fluid pressurizing chamber,
said secondary piston body section being moved to electrically contact said assembly body at the bottom of said secondary fluid pressurizing chamber upon excessive movement of said secondary piston in a secondary chamber fluid pressurizing direction,
and said primary piston being moved to electrically contact said secondary piston body section upon excessive movement of said primary piston toward said secondary piston in a primary chamber fluid pressurizing direction,
said warning indicator being electrically energized when said secondary piston body section is in electrical contact either with said assembly body or with said primary piston or both.

10. The master cylinder assembly of claim 9,
said secondary piston body section having piston rings thereon engaging the wall of said assembly body bore,
said rings being formed of an electrically conductive material having a coating electrically insulating said piston body section from said assembly body.

11. The master cylinder assembly of claim 10,
said rings being aluminum with an anodized hard coat providing an insulating coating and a hard wear surface.

12. The master cylinder of claim 9, further comprising:
a brake fluid reservoir integrally formed as a part of said assembly body,
a third chamber substantially at reservoir pressure encircling an axially center part of said secondary piston body section and separated from said first and second fluid pressurizing chambers by portions of said secondary piston,
an aperture in said assembly body connecting said reservoir and said third chamber,
an insulator in said aperture,
an electrical connector in said insulator and extending into said third chamber and contacting said secondary piston body section throughout the range of operative movement of said secondary piston,
and spring means continually urging said electrical connector into contact with said secondary piston body section.

13. The master cylinder of claim 12,
said spring means being spring means other than said electrical connector and in said reservoir and connected to an insulated electrical post in an exterior wall of said reservoir to electrically connect said connector to said post and spring biased to urge said electrical connector into engagement with said secondary piston body section.

References Cited

UNITED STATES PATENTS

| | | |
|---|---|---|
| 1,557,330 | 10/1925 | Reynolds. |
| 2,093,015 | 9/1937 | Madden. |
| 2,121,653 | 6/1938 | Davis. |
| 2,239,348 | 4/1941 | Wirtanen et al. |
| 2,746,252 | 5/1956 | Reese. |
| 2,815,502 | 12/1957 | Zeller. |
| 2,824,627 | 2/1958 | Winter. |
| 2,857,584 | 10/1958 | Gibson _____ 188—152.02 XR |

MARTIN P. SCHWADRON, *Primary Examiner.*

ROBERT R. BUNEVICH, *Assistant Examiner.*